United States Patent
Park et al.

(10) Patent No.: US 8,175,410 B2
(45) Date of Patent: May 8, 2012

(54) ILLUMINATION NORMALIZING METHOD AND APPARATUS

(75) Inventors: Young-Kyung Park, Seoul (KR); Seok-Lai Park, Ulsan (KR); Ji-Hyoung Son, Seoul (KR); Kwang-Hee Jung, Gyeonggi-do (KR); Joong-Kyu Kim, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1105 days.

(21) Appl. No.: 12/040,170

(22) Filed: Feb. 29, 2008

(65) Prior Publication Data

US 2009/0003726 A1  Jan. 1, 2009

(30) Foreign Application Priority Data

Jun. 27, 2007  (KR) ........................ 10-2007-0063880

(51) Int. Cl.
*G06K 9/40* (2006.01)
(52) U.S. Cl. ........................ 382/274; 382/254
(58) Field of Classification Search .................. 382/274, 382/254
See application file for complete search history.

(56) References Cited

U.S. PATENT DOCUMENTS

| | | | | |
|---|---|---|---|---|
| 5,991,456 A * | 11/1999 | Rahman et al. | ............... | 382/254 |
| 6,788,822 B1 * | 9/2004 | Zhang et al. | ................... | 382/254 |
| 6,834,125 B2 * | 12/2004 | Woodell et al. | ............... | 382/274 |
| 6,885,482 B1 * | 4/2005 | Kubo et al. | .................... | 358/518 |
| 7,199,793 B2 * | 4/2007 | Oh et al. | ........................ | 345/419 |
| 7,382,941 B2 * | 6/2008 | Hwang | .......................... | 382/308 |
| 2005/0073702 A1 * | 4/2005 | Shaked et al. | ................. | 358/1.9 |
| 2008/0101719 A1 * | 5/2008 | Lim et al. | ...................... | 382/274 |
| 2010/0303372 A1 * | 12/2010 | Zhao et al. | .................... | 382/254 |

FOREIGN PATENT DOCUMENTS

| | | |
|---|---|---|
| JP | 2000-268172 | 9/2000 |
| JP | 2006-004090 | 1/2006 |
| KR | 10-0690295 | 2/2007 |
| KR | 10-2006-0095173 | 4/2008 |

OTHER PUBLICATIONS

Jobsen et al "Properties and Performance of a Center/Surround Retinex". IEEE transaction on image processing 1997.*
"A new method of illumination normalization for robust face recognition" CIARP 2006 LNCS 4225 pp. 38-47.*
Chen et "Adaptive smoothing via contextual and local discontinuities" Pattern Analysis and Machine Intelligence, IEEE Transactions on, 2005 1552-1567.*
A new methodology of Illumination Estimation/Normalization Bassed on Adaptive Smoothing for Robust Face Recognition IEEE Oct. 2007.*

* cited by examiner

*Primary Examiner* — Bhavesh Mehta
*Assistant Examiner* — Sean Motsinger
(74) *Attorney, Agent, or Firm* — James P. Muraff; Neal, Gerber & Eisenberg LLP

(57) ABSTRACT

An illumination normalizing apparatus and a method are disclosed. The illumination normalizing apparatus measures a discontinuity of each pixel of an input image, the discontinuity including a spatial gradient and a local inhomogeneity, produces a weight of each pixel from the discontinuity by using a transfer function, produces an estimated illumination by repeating a convolution operation on each weight, and subtracts the estimated illumination from the input image.

8 Claims, 6 Drawing Sheets

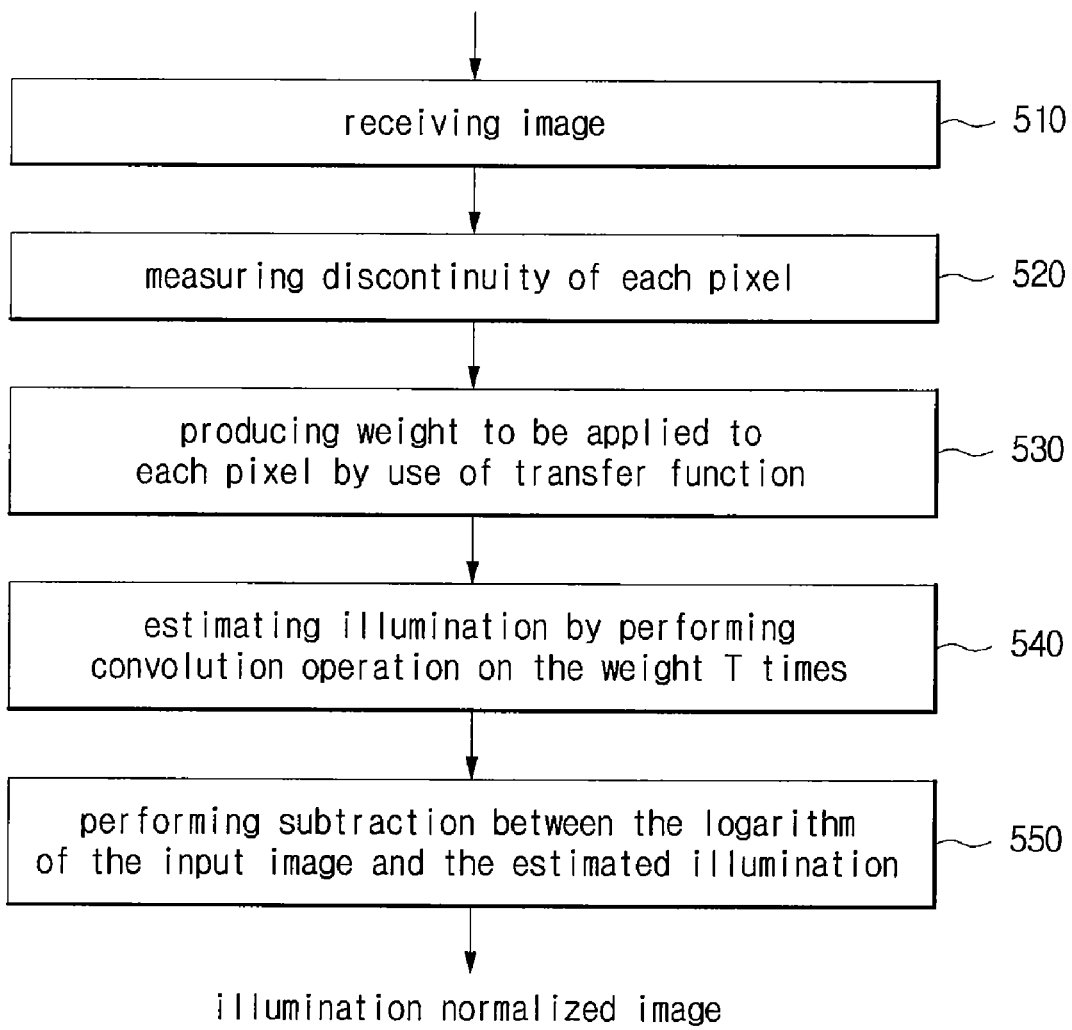

ILLUMINATION NORMALIZING METHOD AND APPARATUS

CROSS-REFERENCE TO RELATED PATENT APPLICATIONS

This application claims the benefit of Korean Patent Application No. 10-2007-0063880, filed on Jun. 27, 2007, in the Korean Intellectual Property Office, the disclosure of which is incorporated herein in its entirety by reference.

BACKGROUND OF THE INVENTION

1. Field of Invention

The present invention relates to an illumination normalization, more particularly, an illumination normalization apparatus of removing shadow on an image.

2. Background Art

An illumination is the most important element in an object recognition system (i.e., face recognition system). The illumination causes changes to image of an object much more than shape. For example, an ambient lighting varies with environmental conditions such as during the daytime and at night, and indoor and outdoor, and the shade generated by a light source from a certain direction may hide a main feature of object.

Recently, in order to overcome this problem, an illumination cone method, which was proposed by Georghiades, is designed. This method performs modeling changes on a face caused by illumination as the illumination cone. If a well-constructed training image was used, its performance is good, however, these model-based methods need limited assumptions and many training images, so that it is difficult to apply to a real situation. On the contrary, Retinex-based method is grounded on a fact that an image is a product of illumination and reflectance, so this is advantages that no training image is required and as a result relatively faster than other methods. In Retinex-based method an assumption is used that illumination smoothly varies but reflectance varies fast. In this assumption, the illumination can be estimated by blurring the image, and be normalized by dividing the estimated value by original image. Examples of this method are SSR (Single Scale Retinex) and SQI (Single Quotient Image). SSR uses a Gaussian filter for blurring and SQI uses a weighed Gaussian filter, which assigns different weights based on the mean value of Convolution region, to apply an effect caused by ununiform changes of illumination.

But all methods as mentioned above cannot remove a local and this may lower a recognition ratio.

SUMMARY OF THE INVENTION

In this disclosure, a method and an apparatus are proposed that use two kinds of discontinuity detecting methods for effectively removing a shadow having discontinuity similar to object's features.

In this disclosure, a method and an apparatus are also proposed that can remove a shadow without degrading of object's features by using a new transfer function when combining two discontinuity detecting methods.

Other features will be appreciated later through the description on embodiments according to the present invention.

According to one aspect associated with the present invention, there is provided an illumination normalizing apparatus including a discontinuity measuring means, measuring a discontinuity of each pixel of an input image, in which the discontinuity includes a spatial gradient and a local inhomogeneity, a weight calculating means, producing a weight of each pixel from the discontinuity by using a transfer function, an illumination estimating means, producing an estimated illumination by repeating a convolution operation on each weight, and an illumination normalizing means, subtracting the estimated illumination from the input image.

The discontinuity measuring means may include a gradient measuring means, producing the spatial gradient by performing a partial differential on the pixel, and an inhomogeneity measuring means, producing differences between luminance of the pixel and each luminance of n adjacent pixels and the mean of differences.

The discontinuity measuring means may control the gradient measuring means and the inhomogeneity measuring means to be independently operated in parallel.

The gradient measuring means may produce the spatial gradient by the following formula:

$$|\nabla I(x,y)| = \sqrt{G_x^2 + G_y^2}$$

Wherein I(x, y) is a value of a pixel that locates on a coordinate (x, y), and $$G_x = I(x+1,y) - I(x-1,y)$$

$$G_y = I(x,y+1) - I(x,y-1)$$

wherein x and y are integers equal or greater than 0.

The inhomogeneity measuring means may produce the local inhomogeneity by the following formula:

$$\bar{\tau}(x, y) = \sin\left(\frac{\pi}{2}\tau_s(x, y)\right)$$

wherein $\tau_s(x, y)$ is $\frac{\tau(x, y) - \tau_{min}}{\tau_{max} - \tau_{min}}$, $$\tau(x, y) \text{ is } \frac{\sum\sum_{(m,n)\in\Omega} |I(x, y) - I(m, n)|}{|\Omega|},$$

$\tau_{max}$ and $\tau_{min}$ are the maximum value and the minimum value among $\tau(x, y)$, respectively, $\Omega$ indicates k adjacent pixels that are adjacent to the pixel at (x, y), (m, n) is a coordinate of an adjacent pixel included in $\Omega$, and m and n are integers.

The weight may be produced by the following formula:

$$w(x, y) = \frac{1}{\sqrt{1 + \frac{\bar{\tau}(x, y)}{h}}} \times \frac{1}{\sqrt{1 + \frac{|\nabla I(x, y)|}{S}}}$$

wherein h and S are real numbers.

The convolution operation may be performed by the following formula:

$$N_{(x,y)}^{(t)} = \sum_{i=-1}^{1}\sum_{j=-1}^{1} w^{(t)}(x+i, y+j)$$

$$L^{(t+1)}(x, y) = \max\left\{\frac{1}{N_{(x,y)}^{(t)}}\sum_{i=-1}^{1}\sum_{j=-1}^{1} L^{(t)}(x+i, y+j) \atop w^{(t)}(x+i, y+j), L^{(t)}(x, y)\right\}$$

wherein $L^{(t)}$ is an estimated illumination of each pixel when the convolution operation is performed t times, $w^{(t)}(x, y)$ is a weight of each pixel when the convolution operation is performed t times, and i and j are integers.

The illumination normalizing means performs a subtraction between the logarithm of the input image and the logarithm of the estimated illumination, and normalizes the result of the subtraction.

According to another aspect associated with the present invention, there is provided an illumination normalizing method that produces at least one discontinuity for each pixel of an input image, produces a weight of each pixel from the discontinuity by using a transfer function, produces an estimated illumination by repeating a convolution operation on each weight, and subtracts the estimated illumination from the input image.

The discontinuity may include a spatial gradient and a local inhomogeneity.

The spatial gradient may be produced by the following formula:

$$|\nabla I(x,y)| = \sqrt{G_x^2 + G_y^2}$$

wherein I(x, y) is a value of a pixel that locates on a coordinate (x, y), and $$G_x = I(x+1, y) - I(x-1, y)$$

$$G_y = I(x, y+1) - I(x, y-1)$$

wherein x and y are integers equal or greater than 0.

The local inhomogeneity may be produced by the following formula:

$$\tilde{\tau}(x, y) = \sin\left(\frac{\pi}{2} \tau_s(x, y)\right)$$

wherein $\tau_s(x, y)$ is $\dfrac{\tau(x, y) - \tau_{min}}{\tau_{max} - \tau_{min}}$, $\tau(x, y)$ is $\dfrac{\sum\sum_{(m,n)\in\Omega} |I(x, y) - I(m, n)|}{|\Omega|}$, $\tau_{max}$ and $\tau_{min}$ are the maximum value and the minimum value among $\tau(x, y)$, respectively, $\Omega$ indicates k adjacent pixels that are adjacent to the pixel at (x, y), (m, n) is a coordinate of an adjacent pixel included in $\Omega$, and m and n are integers.

The weight may be produced by the following formula:

$$w(x, y) = \frac{1}{\sqrt{1 + \dfrac{\tilde{\tau}(x, y)}{h}}} \times \frac{1}{\sqrt{1 + \dfrac{|\nabla I(x, y)|}{S}}}$$

wherein h and S are real numbers.

The convolution operation may be performed by the following formula:

$$N_{(x,y)}^{(t)} = \sum_{i=-1}^{1} \sum_{j=-1}^{1} w^{(t)}(x+i, y+j)$$

-continued $$L^{(t+1)}(x, y) = \max\left\{\begin{array}{l} \dfrac{1}{N_{(x,y)}^{(t)}} \sum_{i=-1}^{1} \sum_{j=-1}^{1} L^{(t)}(x+i, y+j) \\ w^{(t)}(x+i, y+j), L^{(t)}(x, y) \end{array}\right\}$$

wherein $L^{(t)}$ is an estimated illumination of each pixel when the convolution operation is performed t times, $w^{(t)}(x, y)$ is a weight of each pixel when the convolution operation is performed t times, and i and j are integers.

The subtracting the estimated illumination from the input image is a subtraction between the logarithm of the input image and the logarithm of the estimated illumination, and normalizes the result of the subtraction.

According to another aspect associated with the present invention, there is provided a computer-readable medium including a program containing computer-executable instructions for illumination normalization performing the method including producing a vector of the spatial gradient for each pixel of an input image, measuring a local inhomogeneity that indicates the degree of inhomogeneity between the pixel and adjacent pixels, producing a weight for retaining a feature of the input image and for removing a shadow having discontinuity similar to the feature by use of the spatial gradient and the local inhomogeneity, producing an estimated illumination by repeating a convolution operation by use of the weight, and performing a subtraction between the logarithm of the input image and the logarithm of the estimated illumination.

BRIEF DESCRIPTION OF THE DRAWINGS

FIG. 6 is a flowchart of illumination normalization according to one embodiment of the present invention.

DETAILED DESCRIPTION OF THE PREFERRED EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. In describing the present invention, if the description about the prior art may make the subject matter of the present invention vague, then the description will be omitted.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Embodiments according to the present invention can effectively remove a shadow having discontinuity similar to object's feature through combining a spatial gradient detection and an inhomogeneity detection. The spatial gradient detection and the inhomogeneity detection will be described with reference to FIG. 1. The shadow is smoothly removed from a face image after illumination normalization using a discontinuity transfer function suitable for the face image, and the features of face can be retained.

Hereinafter, an illumination refers to a brightness being radiated on an object, and adjacent pixel(s) refers to k number of pixel(s) (k is natural number), which is adjacent to a pixel to be calculated when calculations are performed on each pixel during the illumination normalization.

Hereinafter an illumination normalization apparatus according to embodiments of the present invention will be described with reference to FIG. 1 to FIG. 4.

Figure 1:
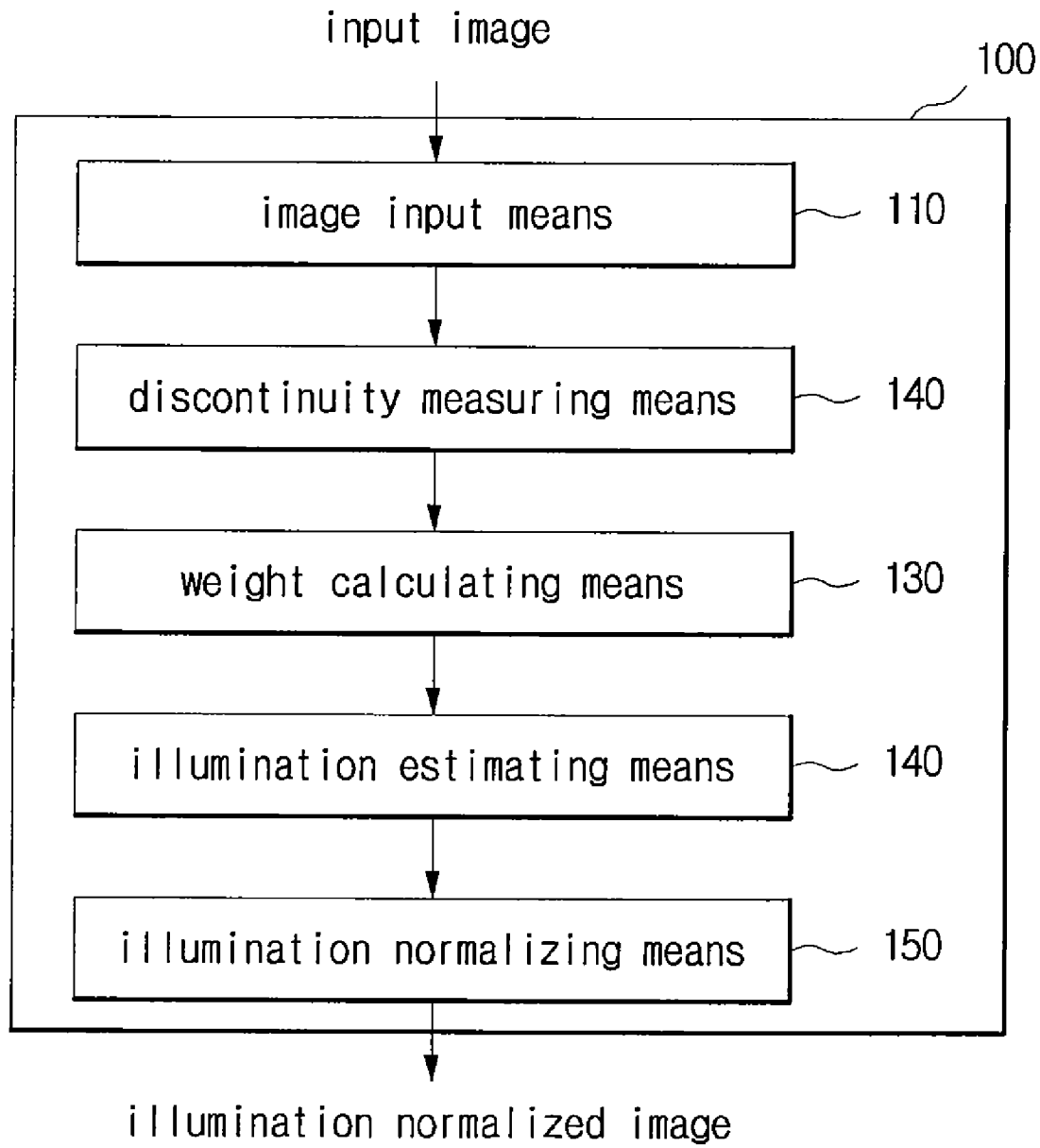
FIG. 1 is a block diagram of an illumination normalizing apparatus according to one embodiment of the present invention.
Figure 2:
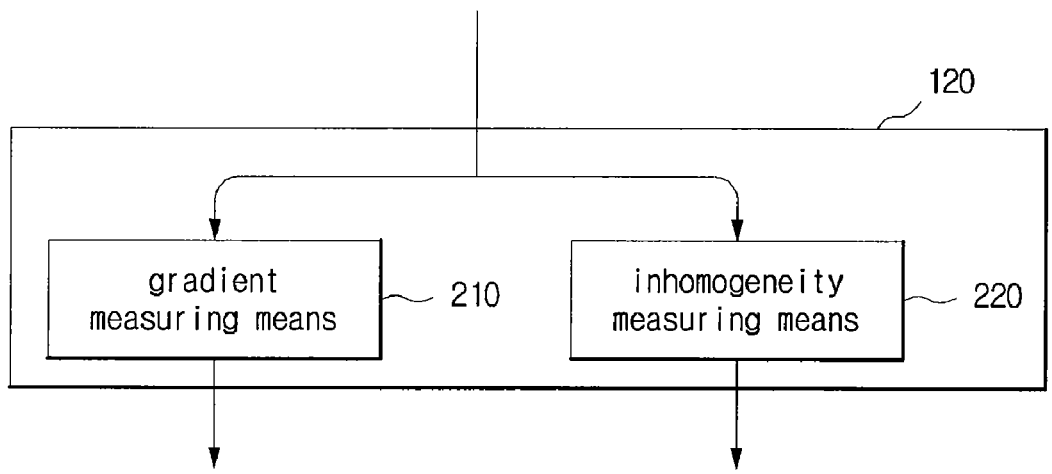
FIG. 2 is a schematic diagram of a discontinuity measuring means according to one embodiment of the present invention.
Figure 3:
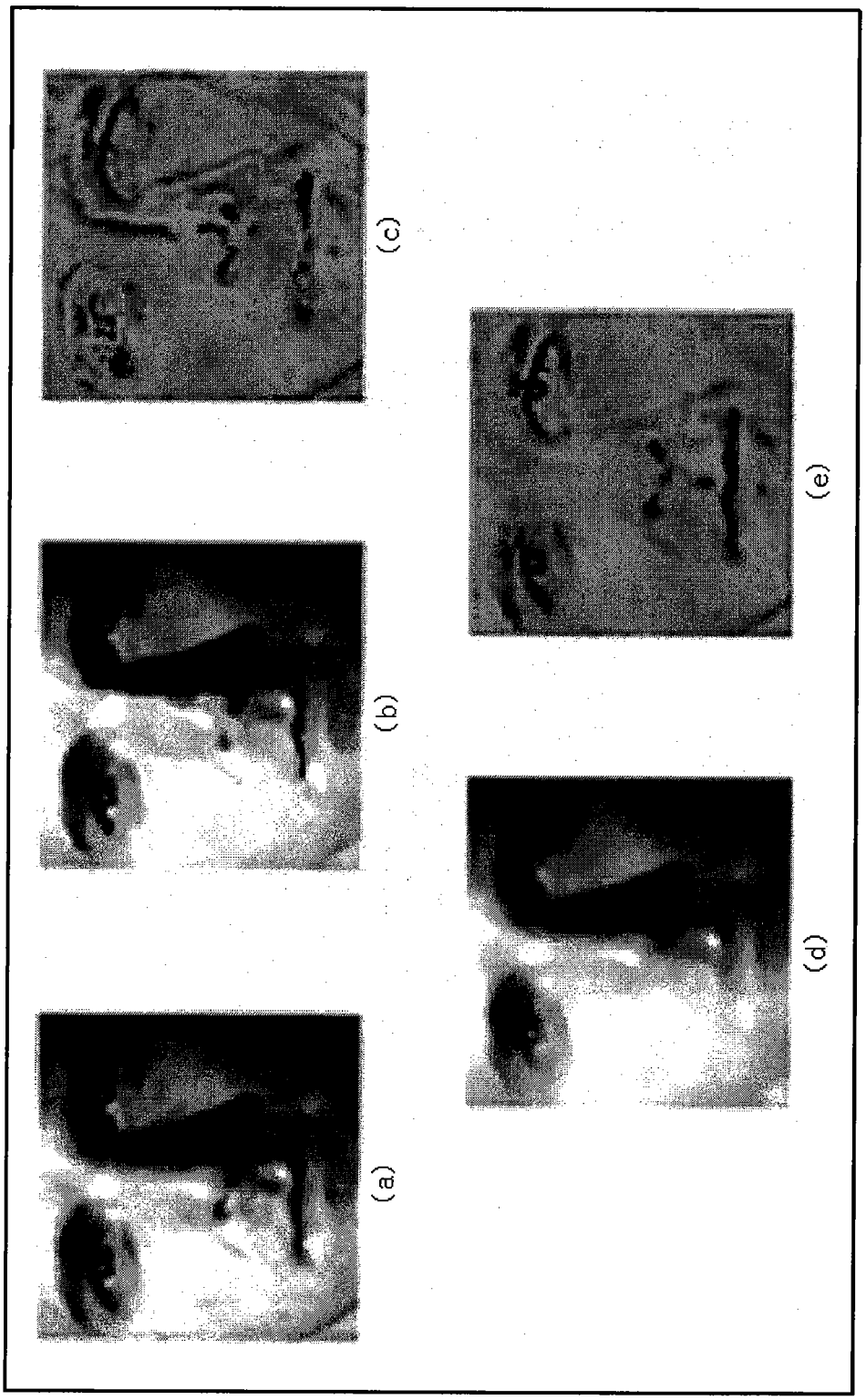
FIG. 3 shows comparison of the illumination normalized image that the conventional transfer function is applied with that that a transfer function according to one embodiment of the present invention is applied.

FIG. 1 is a block diagram of an illumination normalizing apparatus according to one embodiment of the present invention, FIG. 2 is a schematic diagram of a discontinuity measuring means according to one embodiment of the present invention, and FIG. 3 shows comparison of the illumination normalized image that the conventional transfer function is applied with that that a transfer function according to one embodiment of the present invention is applied.

Referring to FIG. 1, the illumination normalizing apparatus 100 includes an image input means 110, a discontinuity measuring means 120, an weight calculating means 130, an illumination estimating means 140, and an illumination normalizing means 150.

The image input means 110 receives an input image. In order to measure discontinuity of the image for the illumination normalization, the image input means 110 sends the image to the discontinuity measuring means 120.

The discontinuity measuring means 120 measures both a spatial gradient and a local discontinuity for each pixel of the image.

As shown in FIG. 2, the discontinuity measuring means 120 includes a gradient measuring means 210 and an inhomogeneity measuring means 220. The discontinuity measuring means 120 outputs the image from the image input means 110 to the gradient measuring means 210 and the inhomogeneity measuring means 220, respectively, and may control the gradient measuring means 210 and the inhomogeneity measuring means 220 to be independently operated in parallel.

Referring to FIG. 2, the gradient measuring means 210 produces a vector's value of the spatial gradient of each pixel of the image, so that it can measure the discontinuity caused by the spatial gradient (hereinafter, referred as "measured discontinuity of spatial gradient").

The spatial gradient is a partial differential at each of pixels (x, y) as defined by Formula 1, and each partial differential is defined by Formula 2, $$\nabla I(x, y) = [G_x, G_y] = \left[\frac{\partial I(x, y)}{\partial x}, \frac{\partial I(x, y)}{\partial y}\right] \quad \text{Formula 1}$$

wherein I(x, y) is a value of a pixel that locates on a coordinate (x, y); $G_x$ and $G_y$ are partial differential values of x and y, respectively; x and y are integers equal or greater than 0. Partial differential values are calculated by Formula 2.

$$G_x = I(x+1, y) - I(x-1, y)$$

$$G_y = I(x, y+1) - I(x, y-1) \quad \text{Formula 2}$$

According to this, the discontinuity measuring means 120 can produce the measured discontinuity of the spatial gradient by calculating a vector's magnitude of the spatial gradient as expressed in Formula 3.

$$|\nabla I(x,y)| = \sqrt{G_x^2 + G_y^2} \quad \text{Formula 3}$$

The inhomogeneity measuring means 220 measures a local inhomogeneity by using k (k is natural number) adjacent pixels. And, the inhomogeneity measuring means 220 normalizes the measured local inhomogeneity by using a predetermined method, and performs a non-linear transform to output to the weight calculating means 140. Hereinafter, for convenience of the description, the local inhomogeneity, which is non-linearly transformed by the inhomogeneity measuring means 220, will be referred as "transformed local inhomogeneity."

Here "local inhomogeneity" is for complementing the discontinuity produced by use of the spatial gradient, and indicates the degree of inhomogeneity between the pixel and adjacent pixels. Thus large local inhomogeneity of a pixel means that discontinuity at the pixel is larger than ones at adjacent pixels.

For example, the inhomogeneity measuring means 220 can produce differences between luminance of the pixel and each luminance of n adjacent pixels and the mean of the differences, and measure the local inhomogeneity. Namely, inhomogeneity measuring means 220 can produce the measured local inhomogeneity by using Formula 4, $$\tau(x, y) = \frac{\sum\sum_{(m,n)\in\Omega} |I(x, y) - I(m, n)|}{|\Omega|} \quad \text{Formula 4}$$

wherein Ω indicates n adjacent pixels, (m, n) is a coordinate of an adjacent pixel included in Ω, τ(x, y) is the mean of differences between luminance of the pixel and each luminance of adjacent pixels (hereinafter, referred as "mean of luminance"), and m and n are integers.

And, the inhomogeneity measuring means 220 performs the non-linear transform on the measured local inhomogeneity and finally outputs the transformed local inhomogeneity to the weight calculating means 130.

For example, the inhomogeneity measuring means 220 normalizes luminance of each pixel to a value within the predetermined range (e.g., between "0" to "1") by using Formula 5, $$\tau_s(x, y) = \frac{\tau(x, y) - \tau_{min}}{\tau_{max} - \tau_{min}}$$  Formula 5 wherein $\tau_{max}$ is the maximum value among mean values (i.e., τ(x, y) values corresponding to each pixel) of luminance associated with each pixel.

As this, after performing the normalization, the inhomogeneity measuring means 220 performs the non-linear transform to emphasize a part having high local inhomogeneity by using Formula 6.

$$\tilde{\tau}(x, y) = \sin\left(\frac{\pi}{2}\tau_s(x, y)\right)$$  Formula 6

As this, the discontinuity measuring means 120 can produce respectively independently the measured discontinuity of spatial gradient and the transformed local inhomogeneity, and output them to the weight calculating means 130.

The weight calculating means 130 produces weights to be applied to each pixel by using independently the measured discontinuity of spatial gradient and the transformed local inhomogeneity from the discontinuity measuring means 120, and sends the weights to the illumination estimating means 140, in which the weights are produced for removing shadows of each pixel.

For example, the weight calculating means 130 can produce a weight of each pixel by inputting the measured discontinuity of spatial gradient and the transformed local inhomogeneity from the discontinuity measuring means 120 to a predetermined transfer function.

For example, the weight calculating means 130 may produce a weight of each pixel by using Formula 7, $$w(x, y) = \frac{1}{\sqrt{1 + \frac{\tilde{\tau}(x, y)}{h}}} \times \frac{1}{\sqrt{1 + \frac{|\nabla I(x, y)|}{S}}}$$  Formula 7 wherein h and S are real numbers.

The illumination estimating means 140 estimates a luminance for each pixel by performing the convolution operation T times (T is a natural number. It may be referred as repeated times based on context) by use of the weight of each pixel from the weight calculating means 130. It will be appreciated the number of repeated times T may vary according to the system implementation.

For example, the illumination estimating means 140 performs the convolution operation by using Formula 8, $$N^{(t)}_{(x,y)} = \sum_{i=-1}^{1}\sum_{j=-1}^{1} w^{(t)}(x+i, y+j)$$  Formula 8

$$L^{(t+1)}(x, y) = \max\left\{\frac{1}{N^{(t)}_{(x,y)}}\sum_{i=-1}^{1}\sum_{j=-1}^{1} L^{(t)}(x+i, y+j)\,w^{(t)}(x+i, y+j), L^{(t)}(x, y)\right\}$$

wherein $L^{(t)}$ is an estimated illumination of each pixel when the convolution operation is performed t times, and $w^{(t)}(x, y$ is a weight of each pixel when the convolution operation is performed t times.

Also, reflectance of illumination has a value within the predetermined range (e.g., a value between "0" to "1"), such that the estimated illumination should not be greater than the luminance of each pixel of the input image. Therefore the illumination estimating means 140 selects the highest value from the results of the $(t+1)^{th}$ operation and the $t^{th}$ operation to prevent the illumination from being greater than the luminance of the input image.

The illumination normalizing means 150 normalizes the illumination of the input image by using the estimated illumination from the illumination estimating means 140.

The illumination normalizing means 150 performs a subtraction between the logarithm of the input image and the logarithm of the estimated illumination, and normalizes the result of the subtraction.

For example, the illumination normalizing means 150 can normalize the illumination by applying the estimated illumination to the input image by using Formula 9.

$$R(x,y)=110\times[\log(I(x,y))-\log(L^{(T)}(x,y))]+150$$  Formula 9

Referring to FIG. 3, 3(*a*) is the input image, 3(*b*) shows the illumination estimated by the conventional method by using the input image, and 3(*c*) shows a result of the illumination normalization by using the conventional estimated illumination. Also in FIG. 3, 3(*d*) shows an estimated illumination by using the transfer function according to one embodiment of the present invention, and 3(*e*) shows a result of the illumination normalization by using the illumination estimated by the transfer function according to one embodiment of the present invention.

When 3(*c*) is compared with 3(*e*) in FIG. 3, it is noted that features of a face in the input image are erased together with shade in 3(*c*), while 3(*e*) is retaining features of the face in the input image (i.e., 3(*a*)).

Namely, as compared to the conventional method, it will be appreciated that the illumination estimation by using the transfer function according to one embodiment of the present invention is more effective.

Figure 4:
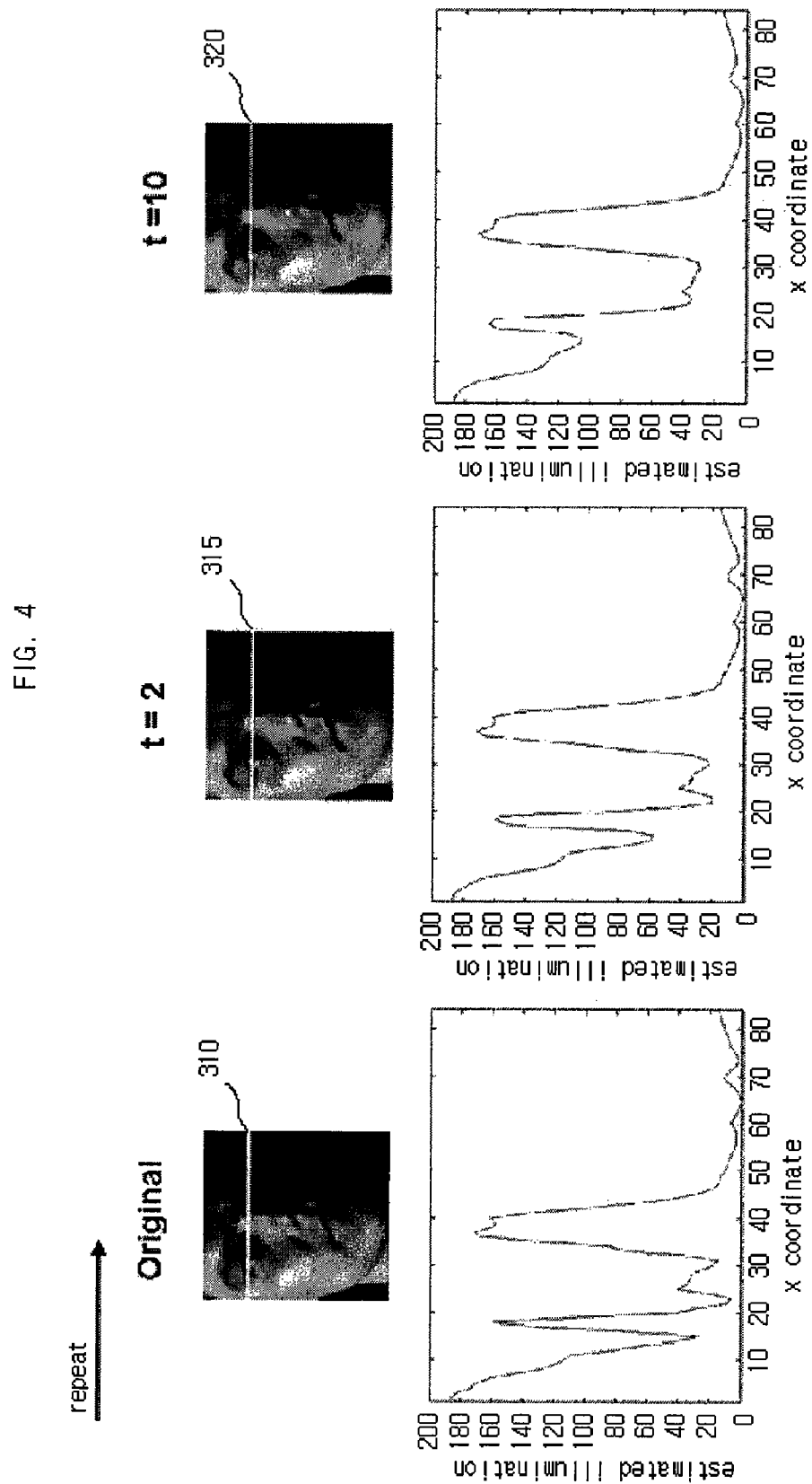
FIG. 4 is a profile of illumination being estimated through repeating the convolution operation according to one embodiment of the present invention.
Figure 5:
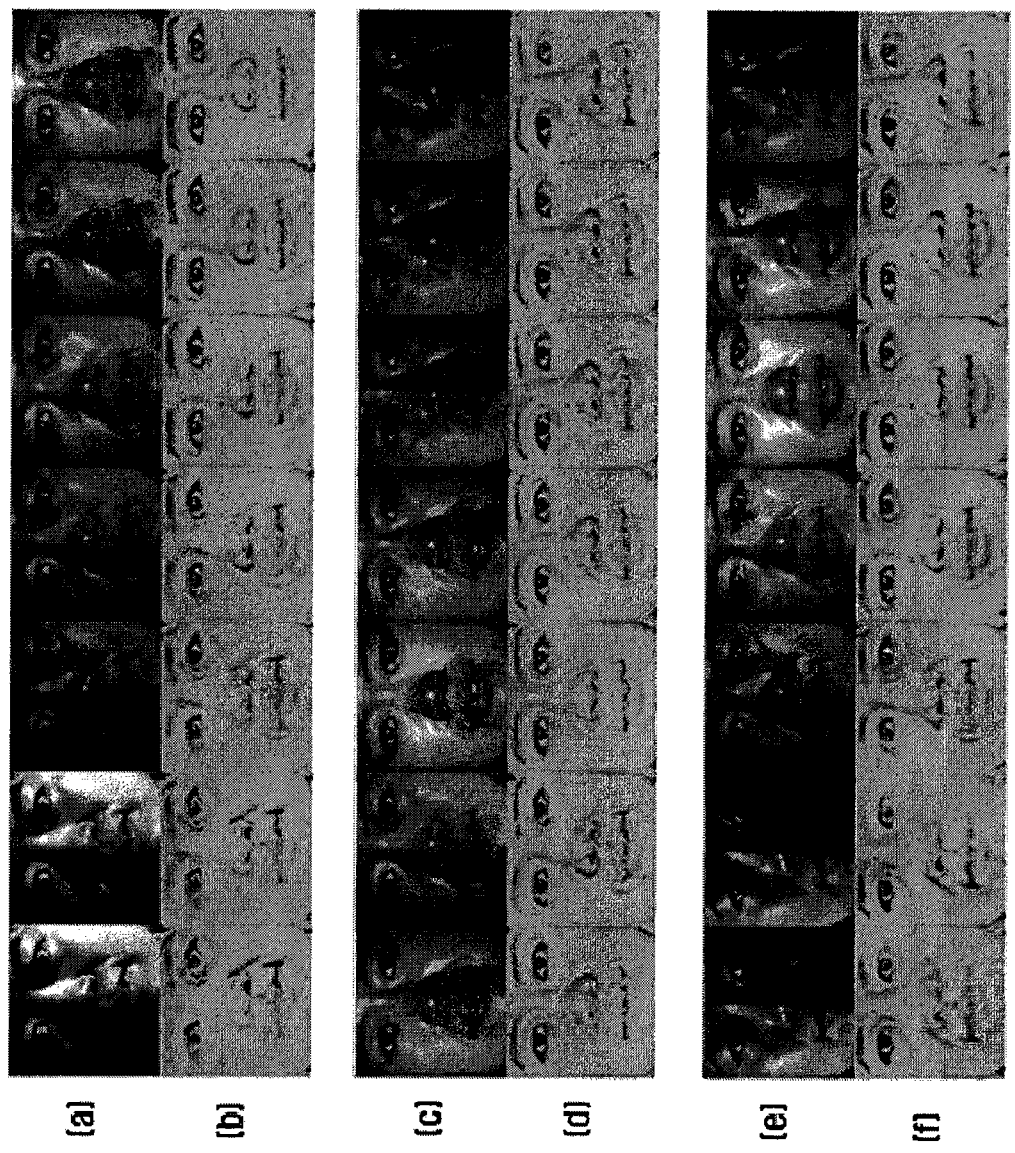
FIG. 5 illustrates normalizations of face image having a strong shadow according to one embodiment of the present invention.

FIG. 4 is a profile of illumination estimated through repeating the convolution operation according to one embodiment of the present invention, and FIG. 5 illustrates normalizations of a face image having a strong shadow according to one embodiment of the present invention.

Each of graphs in FIG. 4 indicates the luminance of each pixel locating on white horizontal lines 310, 315, 320 of each image. Despite the increase of repeated times (t), it will be appreciated that the discontinuity on illumination is retained as shown in graphs. It will be appreciated from this that the discontinuity of input image can be retained despite repeat of convolution operation. Thus, even if the convolution operation is performed repeatedly, it will be appreciated that the shadow can be effectively removed while the object's features of the input image are still retained.

Referring to FIG. 5, 5(*a*), 5(*c*) and 5(*e*) are based on the same object, but have a different intensity and direction of illumination. 5(*b*), 5(*d*) and 5(*f*) are the illumination normalized image of 5(*a*), 5(*c*) and 5(*e*), respectively, and show images similar to each other. From this, it will be appreciated that the recognition error caused by the change of illumination may be reduced by performing the illumination normalization according to one embodiment of the present invention.

FIG. 6 is a flowchart of illumination normalization method being performed by an illumination normalizing apparatus according to one embodiment of the present invention. Although each step to be described below will be performed by each element of the illumination normalizing apparatus 100, it will be referred collectively as illumination normalizing apparatus.

At step 510, the illumination normalizing apparatus 100 receives an input image from an external device such as camera, etc.

At step 520, the illumination normalizing apparatus 100 measures discontinuity of each pixel by use of the input image. The discontinuity is measured by producing the measured discontinuity of spatial gradient and the transformed local inhomogeneity.

At step 530, the illumination normalizing apparatus 100 produces a weight of each pixel by inputting the measured discontinuity of spatial gradient and the transformed local inhomogeneity into a predetermined transfer function.

At step 540, the illumination normalizing apparatus 100 repeats the predetermined convolution operation T times on the weight of each pixel and estimates the illumination.

At step 550, the illumination normalizing apparatus 100 normalizes the illumination by subtracting the estimated illumination from the input image. The illumination normalizing apparatus 100 performs a subtraction between the logarithm of the input image and the logarithm of the estimated illumination to normalize the illumination.

The aforementioned illumination normalizing method can be implemented in the form of computer program. Codes and code segments consisting of the program may be easily made by those skilled in the art. Also, the program may be stored on a computer-readable media, and a computer can read and perform the illumination normalizing method. The computer-readable media may be one of magnetic recording media, optical recording media, and carrier wave media.

Although the present invention is described with embodiment, those who skilled in the art can understand that various modifications, changes, and additions can be made without departing from the mete and scope of the present invention.

What is claimed is:

1. An illumination normalizing apparatus, comprising:
a discontinuity measuring means, measuring a discontinuity of each pixel of an input image, the discontinuity comprising a spatial gradient and a local inhomogeneity;
a weight calculating means, producing a weight of each pixel from the discontinuity by using a transfer function;
an illumination estimating means, producing an estimated illumination by repeating a convolution operation on each weight; and
an illumination normalizing means, subtracting the estimated illumination from the input image,
in which the discontinuity measuring means comprises:
a gradient measuring means, producing the spatial gradient by performing a partial differential on the pixel; and
an inhomogeneity measuring means, producing differences between luminance of the pixel and each luminance of n adjacent pixels and the mean of differences,
in which the discontinuity measuring means controls the gradient measuring means and the inhomogeneity measuring means to be independently operated in parallel,
in which the inhomogeneity measuring means produces the local inhomogeneity by the following formula:

$$\tilde{\tau}(x, y) = \sin\left(\frac{\pi}{2}\tau_s(x, y)\right)$$

wherein $\tau_s(x, y)$ is $\frac{\tau(x, y) - \tau_{min}}{\tau_{max} - \tau_{min}}$, $$\tau(x, y) \text{ is } \frac{\sum\sum_{(m,n)\in\Omega} |I(x, y) - I(m, n)|}{|\Omega|},$$

$\tau_{max}$ and $\tau_{min}$ are the maximum value and the minimum value among $\tau(x, y)$, respectively, $\Omega$ indicates k adjacent pixels that are adjacent to the pixel at $(x, y)$, $(m, n)$ is a coordinate of an adjacent pixel included in $\Omega$, and m and n are integers;
in which the weight is produced by the following formula:

$$w(x, y) = \frac{1}{\sqrt{1 + \frac{\tilde{\tau}(x, y)}{h}}} \times \frac{1}{\sqrt{1 + \frac{|\nabla I(x, y)|}{S}}}$$

wherein h and S are real numbers.

2. The illumination normalizing apparatus of claim 1, in which the gradient measuring means produces the spatial gradient by the following formula:

$$|\nabla I(x,y)| = \sqrt{G_x^2 + G_y^2}$$

wherein $I(x, y)$ is a value of a pixel that locates on a coordinate $(x, y)$, and $$G_x = I(x+1, y) - I(x-1, y)$$

$$G_y = I(x, y+1) - I(x, y-1)$$

wherein x and y are integers equal or greater than 0.

3. The illumination normalizing apparatus of claim 1, in which the convolution operation is performed by the following formula:

$$N_{(x,y)}^{(t)} = \sum_{i=-1}^{1}\sum_{j=-1}^{1} w^{(t)}(x+i, y+j)$$

$$L^{(t+1)}(x, y) = \max\left\{\frac{1}{N_{(x,y)}^{(t)}}\sum_{i=-1}^{1}\sum_{j=-1}^{1} L^{(t)}(x+i, y+j) \atop w^{(t)}(x+i, y+j), L^{(t)}(x, y)\right\}$$

wherein $L^{(t)}$ is an estimated illumination of each pixel when the convolution operation is performed t times, $w^{(t)}(x, y)$ is a weight of each pixel when the convolution operation is performed t times, and i and j are integers.

4. The illumination normalizing apparatus of claim 1, in which the illumination normalizing means performs a subtraction between the logarithm of the input image and the logarithm of the estimated illumination, and normalizes the result of subtraction.

5. An illumination normalizing method, comprising:
producing at least one discontinuity for each pixel of an input image;
producing a weight of each pixel from the discontinuity by using a transfer function;
producing an estimated illumination by repeating a convolution operation on each weight; and
subtracting the estimated illumination from the input image, in which the discontinuity comprises a spatial gradient and a local inhomogeneity,
in which the spatial gradient is produced by the following formula:

$$|\nabla I(x,y)| = \sqrt{G_x^2 + G_y^2}$$

wherein I(x, y) is a value of a pixel that locates on a coordinate (x, y), and $$G_x = I(x+1, y) - I(x-1, y)$$

$$G_y = I(x, y+1) - I(x, y-1)$$

wherein x and y are integers equal or greater than 0,
in which the local inhomogeneity is produced by the following formula:

$$\tilde{\tau}(x, y) = \sin\left(\frac{\pi}{2}\tau_s(x, y)\right)$$

wherein $\tau_s(x, y)$ is $\frac{\tau(x, y) - \tau_{min}}{\tau_{max} - \tau_{min}}$, $$\tau(x, y) \text{ is } \frac{\sum\sum_{(m,n)\in\Omega} |I(x, y) - I(m, n)|}{|\Omega|},$$

$\tau_{max}$ and $\tau_{min}$ are the maximum value and the minimum value among $\tau(x, y)$, respectively, $\Omega$ indicates k adjacent pixels that are adjacent to the pixel at (x, y), (m, n) is a coordinate of an adjacent pixel included in $\Omega$, and m and n are integers,
in which the weight is produced by the following formula:

$$w(x, y) = \frac{1}{\sqrt{1 + \frac{\tilde{\tau}(x, y)}{h}}} \times \frac{1}{\sqrt{1 + \frac{|\nabla I(x, y)|}{S}}}$$

wherein h and S are real numbers.

6. The illumination normalizing method of claim 5, in which the convolution operation is performed by the following formula:

$$N_{(x,y)}^{(t)} = \sum_{i=-1}^{1}\sum_{j=-1}^{1} w^{(t)}(x+i, y+j)$$

$$L^{(t+1)}(x, y) = \max\left\{\frac{1}{N_{(x,y)}^{(t)}}\sum_{i=-1}^{1}\sum_{j=-1}^{1} L^{(t)}(x+i, y+j)\right\}$$
$$w^{(t)}(x+i, y+j), L^{(t)}(x, y)$$

wherein $L^{(t)}$ is an estimated illumination of each pixel when the convolution operation is performed t times, $w^{(t)}(x, y)$ is a weight of each pixel when the convolution operation is performed t times, and i and j are integers.

7. The illumination normalizing method of claim 5, in which the subtracting the estimated illumination from the input image is a subtraction between the logarithm of the input image and the logarithm of the estimated illumination, and normalizes the result of subtraction.

8. A non-transitory computer-readable storage medium including a program containing computer-executable instructions for illumination normalization performing the method comprising:
  producing a vector of spatial gradient for each pixel of an input image;
  measuring a local inhomogeneity that indicates the degree of inhomogeneity between the pixel and adjacent pixels;
  producing a weight for retaining a feature of the input image and for removing a shadow having discontinuity similar to the feature by use of the spatial gradient and the local inhomogeneity;
  producing an estimated illumination by repeating a convolution operation by use of the weight; and
  performing a subtraction between the logarithm of the input image and the logarithm of the estimated illumination,
in which the discontinuity comprises a spatial gradient and a local inhomogeneity,
in which the spatial gradient is produced by the following formula:

$$|\nabla I(x,y)| = \sqrt{G_x^2 + G_y^2}$$

wherein I(x, y) is a value of a pixel that locates on a coordinate (x, y), and $$G_x = I(x+1, y) - I(x-1, y)$$

$$G_y = I(x, y+1) - I(x, y-1)$$

wherein x and y are integers equal or greater than 0,
in which the local inhomogeneity is produced by the following formula:

$$\tilde{\tau}(x, y) = \sin\left(\frac{\pi}{2}\tau_s(x, y)\right)$$

wherein $\tau_s(x, y)$ is $\frac{\tau(x, y) - \tau_{min}}{\tau_{max} - \tau_{min}}$, $$\tau(x, y) \text{ is } \frac{\sum\sum_{(m,n)\in\Omega} |I(x, y) - I(m, n)|}{|\Omega|},$$

$\tau_{max}$ and $\tau_{min}$ are the maximum value and the minimum value among $\tau(x, y)$, respectively, $\Omega$ indicates k adjacent pixels that are adjacent to the pixel at (x, y), (m, n) is a coordinate of an adjacent pixel included in $\Omega$, and m and n are integers,
in which the weight is produced by the following formula:

$$w(x, y) = \frac{1}{\sqrt{1 + \frac{\tilde{\tau}(x, y)}{h}}} \times \frac{1}{\sqrt{1 + \frac{|\nabla I(x, y)|}{S}}}$$

wherein h and S are real numbers.

* * * * *